Feb. 18, 1930.   L. DE VITO   1,747,970
CRUSHER
Filed Jan. 4, 1929   2 Sheets-Sheet 1
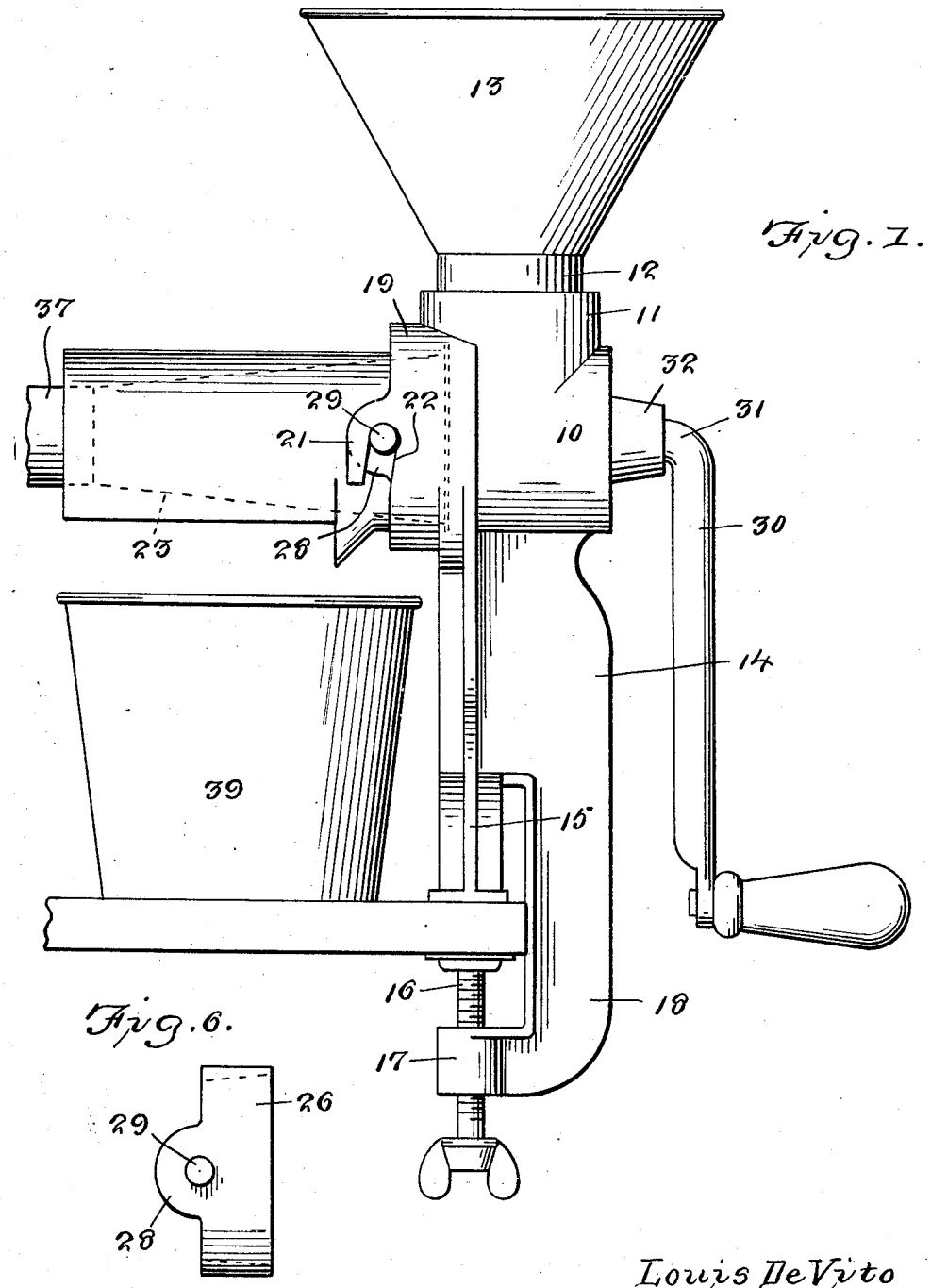
Louis DeVito
INVENTOR
BY Victor J. Evans
ATTORNEY Feb. 18, 1930.                L. DE VITO                1,747,970
                               CRUSHER
                         Filed Jan. 4, 1929        2 Sheets-Sheet 2
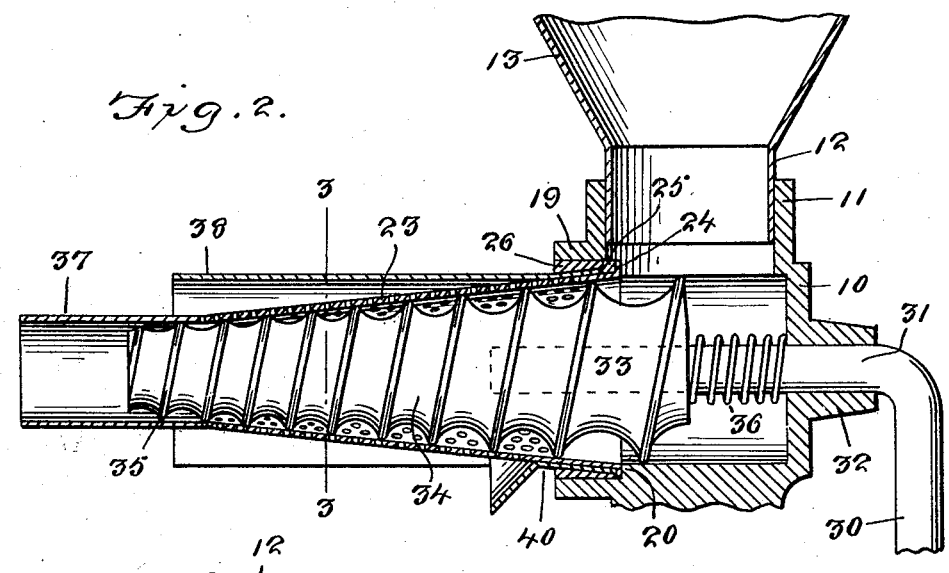
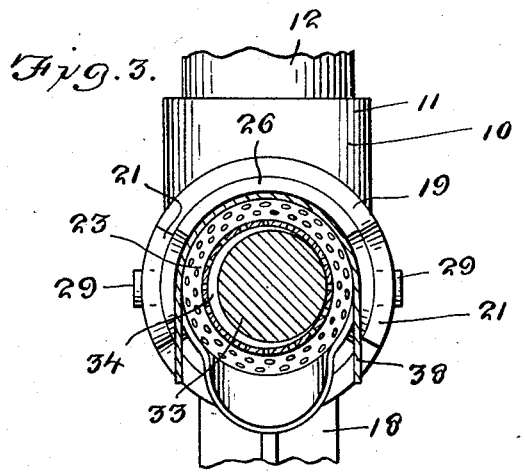
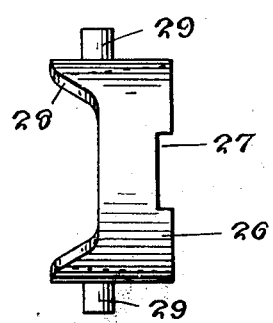
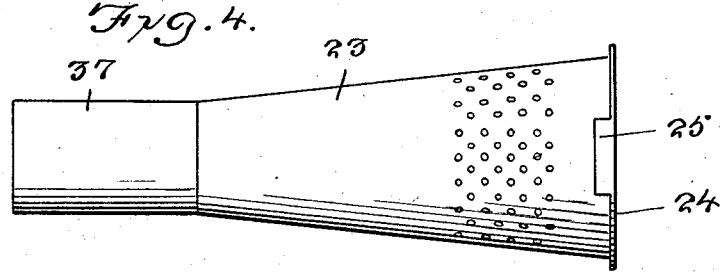
Louis DeVito
INVENTOR
BY Victor J. Evans
ATTORNEY Patented Feb. 18, 1930

1,747,970

UNITED STATES PATENT OFFICE

LOUIS DE VITO, OF CLEVELAND, OHIO

CRUSHER

Application filed January 4, 1929. Serial No. 330,354.

This invention relates to improvements in crushers primarily adapted to separate the meat and juice of fruits and vegetables.

An object of the invention comprehends a housing including a hopper.

Another object of the invention contemplates a perforated cylinder projecting from the housing.

A further object of the invention consists in the provision of a feeding element for the cylinder to purge the juice of fruits and vegetables therethrough.

More specifically stated the feeding element is yieldingly retained in position whereby the utmost juice may be purged from the fruit or vegetable.

With the above and other objects in view, the invention further consists of the following novel features and details of construction, to be hereinafter more fully described, illustrated in the accompanying drawings and pointed out in the appended claim.

In the drawings:—

Figure 1 is an elevation of the present invention.

Figure 2 is a longitudinal sectional view taken through the cylinder and illustrating the relative arrangement of the feeding element therewith.

Figure 3 is a vertical horizontal sectional view taken on line 3—3 of Figure 2.

Figure 4 is an elevation of the cylinder per se.

Figure 5 is a top plan view of a coupling for the cylinder.

Figure 6 is a side elevation of the coupling.

Referring to the drawings in detail, wherein like characters of reference denote corresponding parts, the reference character 10 indicates a housing including a neck 11 in communication therewith and upstanding an appreciable distance therefrom. The discharge end 12 of a hopper 13 is adapted for reception within the neck 11 in the manner shown in Figures 1 and 2 of the drawings.

A supporting structure for the housing, as indicated at 14, having spaced legs 15 primarily adapted to repose upon the upper surface of a table top, is adapted for cooperation with an adjusting screw 16 threadedly mounted within a sleeve member 17 formed in the end of an arm 18 projecting from the supporting structure 14 substantially as illustrated in Figure 1 of the drawings.

A sleeve member 19, carried by and projecting from that portion of the housing facing the table, includes a shoulder or abutment 20 within the bore thereof, the purpose of which will be presently apparent. The sleeve member 19 is further provided with ears or projections 21 extended outwardly and downwardly, and outwardly and upwardly respectively upon diametrically opposite sides and upon the outer periphery of the sleeve. Pockets or slots 22, defined between the outer periphery of the sleeve member 19 and the adjacent inner sides of the ears 21, are inwardly and obliquely disposed in the manner shown in Figure 1 of the drawings. A cylinder, of frusto-conical shape, such as indicated at 23, is provided with an outwardly flared flange portion 24 upon the larger end thereof and which is adapted to abut the shoulder 20 in the manner shown in Figure 2 of the drawings. An arcuate-shaped member 25, carried upon the outer surface of the cylinder 23 and abutting the adjacent surface of the flange 24, is adapted for connection and communication with the shoulder 20 to complete same at the top thereof within the housing.

An annulus or collar 26, carried upon the cylinder 23, includes a cut-out 27 upon the innermost side edge thereof to accommodate the arcuate-shaped member 25. Lugs 28, forwardly projecting in parallelism upon the outer side edge of the collar or annulus 26 and upon diametrically opposite sides thereof, carry studs 29 upon the outer sides thereof with their approximate centers in line with the aforementioned edge of the collar or annulus. After the collar or annulus has been slid upon the cylinder 23 to occupy the Figure 2 position, the two may then be rotated due to the connection therebetween provided by the arcuate-shaped member and slot. The studs 29 engaging the outer surface of the sleeve member 19 are slid thereagainst after the cylinder 23 and collar or annulus 26 is rotated in a counter-clockwise direction. Such movement will ultimately dispose the studs 29 within the pockets 22; the latter due to their particular dispositions will direct and force the inner adjacent portions of the cylinder 23 and especially the flange 24 therefor and the innermost edge of the annulus 26 against the shoulder 20.

A crank or handle 30, having the offset extremity 31 therefor extended through a bearing sleeve 32 upon the housing 10, is axially aligned with the longitudinal center of the cylinder 23.

At this instance, it may be said that the cylinder 23 is perforated, reticulated or foraminated, pursuant to the particular usage to which the present invention is subjected.

A feeding element, as indicated at 33, is also of frusto-conical shape in conformity with the inner side walls of the cylinder 23. A spiral groove, indicated generally as at 34, and arranged upon the outer surface of the feeding element 33, varies in end to end relation both as to width between the walls thereof and depth of the groove. The communicating edges between the side walls of adjacent grooves are rounded, as at 35, to abut the bottom of a housing and the inner side walls of the cylinder 23 to relieve friction therebetween. The offset extremity 31 of the crank or handle 30 within the housing is threadedly engaged within a socket opening in the enlarged end of the feeding element. A compression spring 36, encircling the exposed portion of the offset end 31 of the crank or handle 30 between the enlarged end of the feeding element and the adjacent wall of the housing, is adapted to provide a yielding connection between the feeding element and the source of power therefor.

A conduit or tube 37, carried by and formed as a continuation of the smaller end of the cylinder 23 and extended for appreciable distances beyond the outermost tapered end of the feeding element 33, is adapted to convey the skins, rinds, seeds, pulp and other foreign matter as refuse from the fruit or vegetable crushed and squeezed. By reason of the fact that the distances between the side walls of the grooves vary both as to width and depth in end to end relation throughout the length of the feeding element, it is to be noted that after the fruit or vegetable is squeezed, the same, as crushed, is shifted along in the grooves of smaller sizes to further compress same and squeeze the juice therefrom whereby the utmost juice may be squeezed from the fruit or vegetable without rendering the juice, as collected, clouded incident to excess squeezing and to collect the juice with its natural taste devoid of the usual bitterness noticeable where the fruit has been compressed to such an extent that the bitterness from the hull is squeezed out.

Incident to the employment of the present invention, by reason of the fact that the fruit or vegetable is squeezed circumferentially of the feeding element and cylinder, it is obviously apparent that the juice will be noticed to spray upwardly through the perforations or foraminations in the cylinder and for this reason I have provided a hood of the configuration shown, as at 38.

Said hood has parallel sides and a rounded top with its under side open to permit the juice flow within a receptacle 39 located immediately therebeneath.

The invention is susceptible of various changes in its form, proportions and minor details of construction, and the right is herein reserved to make such changes as properly fall within the scope of the appended claim.

Having described the invention, what is claimed is:—

A sqeezer and crusher comprising a housing including a collar projecting therefrom at rightangles thereto and in communication with the interior thereof, said collar having a shoulder within the bore thereof, a perforated cylinder of frusto-conical shape having an outwardly projecting annular flange upon one end disposed in juxtaposition to the outer face of the shoulder; an arcuate-shaped member carried upon the flange; ears carried by and projecting in concentric relation upon opposite sides of the collar and forming pockets therebetween, an annulus telescopically associated with the cylinder and abutting the annular flange thereof, studs carried by and outwardly projecting from opposite sides of the annulus and receivable within said pockets, and said annulus having a pocket to accommodate the arcuate-shaped member to prevent turning of the cylinder.

In testimony whereof I affix my signature.

LOUIS DE VITO.